Patented Oct. 12, 1943

2,331,279

UNITED STATES PATENT OFFICE 2,331,279

TREATMENT OF MUD-LADEN DRILLING FLUIDS

Truman B. Wayne, Houston, Tex.

No Drawing. Application March 31, 1939, Serial No. 265,146

15 Claims. (Cl. 252—8.5)

This invention relates generally to the treatment of mud-laden drilling fluids, and particularly to the treatment of such fluids as are employed in the rotary drilling of oil and gas wells so as to improve the physical properties of said fluids.

The fluid employed for rotary drilling operations contains a gel-forming component and may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult.

It is an object of the present invention, generally stated, to provide a process and agent for the treatment of mud-laden drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden drilling fluid and the process of making it in which the properties of the colloidal matter in the fluid are substantially modified and rendered suitable for rotary drilling purposes.

A more specific object of this invention is to provide a process and agent for the treatment of mud-laden drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, the degelling action on the mud-laden fluid is produced by a class of chemical substances which are herein described as an "amino-phosphate body." This term is intended to include various reaction products, whether by substitution or addition, of phosphorous or phosphoric acids, or halides and anhydrides thereof, with substances generally described as "amino bodies" which includes various amino, imino, amido, or imido bodies capable of reacting with the various acids, anhydrides, and halides of phosphorus either at the amino group of residue, or at some other point in the molecule, for instance, at a hydroxyl group. Said amino phosphates may be salts, amides, imides, or esters, or mixed amino-esters, depending on whether reaction occurs to produce one or more ester linkages instead of, or in addition to, reaction at the amino group or residue.

Examples of such compositions possessing both ester and amino groups will be hereinafter described.

One species of "amino-phosphate body" which has been found to be particularly suitable for my purpose are the ammonia-phosphorus pentoxide complexes produced according to United States Patent No. 2,122,122 to Willard H. Woodstock. These are produced by reacting anhydrous liquid or gaseous ammonia with phosphorus pentoxide at temperatures below 150° C., and then heating the resulting reaction product in the presence of ammonia for a considerable period of time at temperatures above 150° C. The complexity of the molecule, produced by polymerization, increases with temperatures above 150° C., and differs considerably from the initial product prepared at lower temperatures. The Woodstock patent discloses two possible structural formulas for the initial product, namely:

(I)

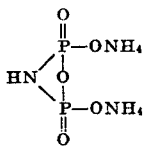

or (II)

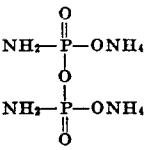

Product II may lose one molecule of ammonia to form Product I, or two molecules of Product II may condense, losing two molecules of ammonia to form a product of the following type formula:

(III)

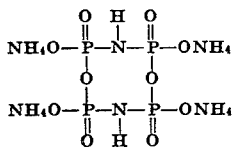

The ratio of nitrogen to phosphorus decreases as polymerization occurs, which is analogous to the loss of water from inorganic phosphates as they are polymerized to polyphosphates. These substances are, therefore, a specific type of polyphosphate.

A second species of "amino-phosphate body" suitable for my purpose are the reaction products of phosphorus acids, or their anhydrides, with alkyl amines, preferably the alkylolamines or their reaction products which still possess reaction amino residues or other reactive groups, for instance, such as hydroxyl groups. Products possessing very suitable properties can be prepared by acylation (as differentiated from ordinary amine salt formation through neutralization, which is claimed in earlier applications) of non-hydroxy alkyl amines, but in general the alkylolamines are to be preferred. They possess more reactive groups and retain their water solubility to a greater extent even though more highly polymerized. Suitable reagents may be prepared according to the general disclosures of U. S. Patent No. 2,063,963 to Ulrich et al., as exemplified by Example 3 of that patent, or any of the other examples of that patent wherein an acid of phosphorus is substituted for the sulfuric or chlorosulfonic acid used by Ulrich et al.

A third species of "amino-phosphate body" suitable for my purpose are the phosphates of aliphatic esters of amino acids. The reactive carboxyl group of such amino acids has been blocked by the ester linkage, and the resulting amino acid ester reacts by addition to equimolecular proportions of phosphoric acid. U. S. Patent No. 2,103,558 to Schoeller et al. discloses such phosphates of amino acid esters prepared from ortho-phosphoric acid and esters of amino acids such as glycocol and sarcosine, and typifies such reaction products by the general formula:

(NX₂R'COOR)H₃PO₄ wherein X is hydrogen or a substituent element or group, and R and R' represent alkyl, aryl, aralkyl, or alicyclic radicals.

In connection with the present invention, the type formula of Schoeller et al. can be extended to include not only ortho-phosphoric acid, H₃PO₄, as shown by Schoeller, but meta-phosphoric acid and the various poly-phosphoric acids such as pyrophosphoric acid, triphosphoric acid, tetraphosphoric acid, and higher poly-acids and acid salts of phosphorus.

The three species belonging to the general class of substances herein generally described as an "amino-phosphate body" are all characterized by the presence of an amino group or residue attached to a radical, R, which may be acyl, alkyl, aryl, aralkyl, or alicyclic, and wherein the hydrogens X₂ may remain unsubstituted, or may be substituted by alkyl, aryl, aralkyl, alicyclic, or acyl groups. If the NX₂ group reacts directly with the phosphorus acid the phosphorus acid radical may form a salt with or acylate the NX₂ group. The phosphorus acid may also react with hydroxyl groups attached to the amino body to form more complex amino-ester bodies, or may react with the hydroxyl groups to the exclusion of the amino group if the latter has been otherwise substituted. Of course, if the amino body is still capable of reacting as a base, the quaternary ammonium salt can be formed to the exclusion of, or in connection with, esterification of the hydroxyl atoms. It is clear, therefore, that the three species of compounds herein disclosed as treating agents for drilling fluids may all be generically described by the type formula:

[(R.NX₂)n.Pn]x wherein R.NX₂ represents a substituted ammonia radical wherein R may be acyl, alkyl, aryl, aralkyl, or alicyclic, X is hydrogen or a substituent element or group, P is a phosphorus acid radical, n is the number 1 or more, and x is the degree of polymerization which may be 1 or more.

In order to illustrate the principles of my invention, a number of specific examples are hereinafter given. However, it should be distinctly understood that I do not confine myself to the specific treating agents, drilling fluid compositions or proportions hereinafter disclosed, as it should be understood by those skilled in the art that variations from these disclosures do not depart from the principles and spirit of my invention which is directed in a general way to the use of organic derivatives of phosphorus acids characterized by the presence of one or more amino residues in the molecule, and which are herein described as "amino-phosphate bodies," in the degelling and controlling of the viscosity of mud-laden or rotary drilling fluids.

In the examples given the application of the reagent is illustrated in connection with a drilling fluid composed of Wyoming bentonite and water in which the bentonite is about 8% by weight of the fluid. Such a drilling fluid is useful in drilling, and as prepared has a viscosity of 48 centipoises by a Stormer viscosimeter at 600 R. P. M.

*Example 1*

100 milliliters of a drilling fluid whose initial viscosity was 48 centipoises were treated with varying proportions of an amino-phosphate prepared by reacting one mol of triethanolamine (140 g.) with one mol of tetraphosphoric acid (338 g.) initially at 100–120° C. and finally at 200° C. for three hours. An inert solvent was used to carry water produced by esterification of two amino hydroxyls out of the reaction mass. The product is soluble in water, and acidic in reaction. It probably consists of the amine salt of the tetraphosphoric acid in which other acidic valences of the polyphosphoric acid have esterified two of the amino hydroxyls of the alkylolamine radical.

| Proportion of aminophosphate | Volume of drilling fluid | Initial viscosity | Final viscosity |
|---|---|---|---|
| Grams | Milliliters | Centipoises | Centipoises |
| 0.05 | 100 | 48 | 31 |
| 0.10 | 100 | 48 | 28 |
| 0.20 | 100 | 48 | 23 |

*Example 2*

An amino-phosphate derivative was prepared by reacting 1 mol (338 g.) of technical tetraphosphoric acid with 1 mol (90 g.) of technical monoamylamine at 200° C. for two hours. The resinous reaction product is soluble in water.

A well drilling fluid with an initial viscosity of 48 centipoises was treated with several proportions of this amino-phosphate derivative as follows:

| Proportion of aminophosphate | Volume of drilling fluid | Initial viscosity | Final viscosity |
|---|---|---|---|
| Grams | Milliliters | Centipoises | Centipoises |
| 0.05 | 100 | 48 | 31 |
| 0.10 | 100 | 48 | 28 |
| 0.20 | 100 | 48 | 23 |

*Example 3*

A highly polymerized $P_2O_5$—$NH_3$ complex prepared according to the Woodstock Patent No. 1,222,122 and probably having a structure similar to type Formula III

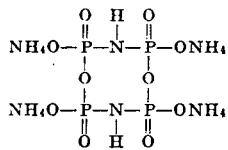

was dissolved as a 10% aqueous solution and added to a drilling fluid in the proportions shown. This material is not entirely soluble as a 10% solution but formed a stable emulsion which could be accurately measured. After standing for several days it dissolved completely. No appreciable difference in efficiency was noted when using the fresh emulsion or the completely dissolved material after standing. Doubtless reversion to simpler forms accounted for the solubility after standing. The following tests represent those made on the freshly prepared solution.

| Proportion of aminophosphate | Volume of drilling fluid | Initial viscosity | Final viscosity |
|---|---|---|---|
| Grams | Milliliters | Centipoises | Centipoises |
| 0.02 | 100 | 48 | 33 |
| 0.04 | 100 | 48 | 29 |
| 0.10 | 100 | 48 | 28 |
| 0.20 | 100 | 48 | 23 |

The highly polymerized form of $P_2O_5$—$NH_3$ complex shown in the above example may be further modified by melting it at low redness. Ammonia is driven off with the result that substances of phosphimic or phosphamic nature, as well as other complex nitrogenous substances are formed. If the melt is cooled quickly, a clear "glass" is formed which is soluble in water. This "glass" may be used as a treating agent in a manner analogous to the other polymerized substances of similar nature above described.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 48 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatments with my improved treating agent to produce normal viscosities for muds so contaminated.

Suitable amines may be selected from the group comprising non-hydroxy alkyl amines such as ethyl amine, propylamine, butylamine, amylamine, and octylamine; cycloalkyl amines such as cyclohexylamine and methylcyclohexylamine; aralkyl amines such as benzylamine, benzyl amyl amine, etc.; hydroxyamines such as mono-, di-, and tri-ethanol or propanol amines, and hydroxyalkyl-alkylamines such as N - mono - n-butyl-N-hydroxyethylamine, 1 - mono-amyl-amino-2-hydroxy-3-propanol, etc., are also suitable, and in many cases are preferred for the reason that they possess reactive hydroxyl groups capable of esterification by the polybasic inorganic acid.

Various amino acid esters derived either from natural animal or vegetable sources, or prepared synthetically, may be substituted for the glycocol or sarcosine esters above disclosed. Any amino acid compound which acts as a base in the presence of phosphorus acids is contemplated.

The viscosity-reducing agent embodying this invention is substantially an amino-phosphate, as distinguished from casein which has only a very small percentage of phosphorus, for example, 0.86% (Whitmore's Organic Chemistry, 1937, page 613), and which is a viscosity-augmenting agent.

While the polyphosphoric acid, tetraphosphoric acid, has been used in each of the preceding examples because of its anhydrous state which facilitates ester production, any other oxy-acid of phosphorus, or its corresponding anhydride, may be used. The various phosphoric acids and their poly-derivatives are preferred in the prepartion of the N-alkylated amino compounds, and it is, of course, necessary to use phosphorus pentoxide in the preparation of the reagent used in Example 3. Derivatives of phosphorus or phosphoric acids having S, N, or halogen in their molecular structure are, of course, suitable for my purpose. These compounds are described with reference to sulfur in Roscoe and Schorlemmer, "Treatise on Chemistry," fifth edition, 1920, pages 679–83, and in Mellor's "Treatise on Inorganic and Theoretical Chemistry," 1928, volume VIII pages 1062–70; with reference to nitrogen, by Roscoe and Schorlemmer, pages 684–88, and by Mellor, volume VIII, pages 704–28; and with reference to halogen by Roscoe and Schorlemmer, pages 675–78. However, many of these are difficult to isolate in their free state, and usually exist only as salts. They are, however, members of the class of phosphorus acids contemplated for use in the preparation of the reagents used in my improved process.

It will be understood that in the claims where reference is made to the reaction product of "a phosphorus acid" etc. that this shall include its anhydride.

I claim:

1. An aqueous mud-laden drilling fluid for wells containing a small percentage of a viscosity-reducing compound having a substantial portion of a phosphorus acid residue, which compound is an amino-phosphate body and characterized by the fact that it is dispersible in a mud-laden fluid and further characterized by the fact that it is capable of reducing viscosity resulting from the state of gelation of said fluid during the drilling operation.

2. The process of controlling the viscosity of aqueous mud-laden well drilling fluids comprising adding thereto a small percentage of a viscosity-reducing compound having a substantial portion of a phosphorus acid residue, which compound is an amino-phosphate body and characterized by the fact that it is dispersible in a mud-laden fluid and further characterized by the fact that it is capable of reducing viscosity resulting from the state of gelation of said fluid during the drilling operation.

3. An aqueous mud-laden drilling fluid for wells containing a small percentage of a viscosity-reducing agent comprising an amino-phosphate body, viz., $$[(R.NX_2)_n.P_n]_x$$

wherein $R.NX_2$ represents a substituted ammonia radical wherein R is a radical selected from the group consisting of acyl, alkyl, aryl, aralkyl, and alicyclic radicals, $NX_2$ is a residue selected from the group consisting of substituted and unsubstituted amino residues, P is a phosphorus acid radical, $n$ is a number which is at least 1, and $x$ is the degree of polymerization which is at least 1, and characterized by the fact that it is dispersible in a mud-laden fluid and further characterized by the fact that it is capable of reducing viscosity resulting from the state of gelation of said fluid during the drilling operation.

4. An aqueous mud-laden drilling fluid for wells containing a small percentage of a viscosity-reducing agent comprising an amino-phosphate body, viz.,

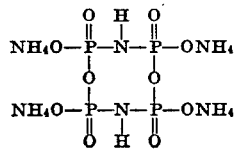

and characterized by the fact that it is dispersible in a mud-laden fluid and further characterized by the fact that it is capable of reducing viscosity resulting from the state of gelation of said fluid during the drilling operation.

5. An aqueous mud-laden drilling fluid for wells containing a small percentage of a viscosity-reducing compound having a substantial portion of a polyphosphoric acid residue, which compound is an amino-phosphate body and characterized by the fact that it is capable of reducing viscosity resulting from the state of gelation of said fluid during the drilling operation.

6. The process of controlling the viscosity of aqueous mud-laden drilling fluids by adding thereto a small percentage of a viscosity-reducing agent comprising an amino-phosphate body, viz., $$[(R.NX_2)_n.P_n]_x$$

wherein $R.NX_2$ represents a substituted ammonia radical wherein R is a radical selected from the group consisting of acyl, alkyl, aryl, aralkyl, and alicyclic radicals, $NX_2$ is a residue selected from the group consisting of substituted and unsubstituted amino residues, P is a phosphorus acid radical, $n$ is a number which is at least 1, and $x$ is the degree of polymerization which is at least 1, and characterized by the fact that it is dispersible in a mud-laden fluid and further characterized by the fact that it is capable of reducing viscosity resulting from the state of gelation of said fluid during the drilling operation.

7. The process of controlling the viscosity of aqueous mud-laden drilling fluids by adding thereto a small percentage of a viscosity-reducing agent comprising an amino-phosphate body, viz.,

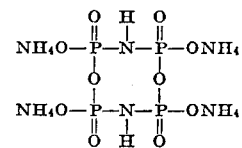

and characterized by the fact that it is dispersible in a mud-laden fluid and further characterized by the fact that it is capable of reducing viscosity resulting from the state of gelation of said fluid during the drilling operation.

8. The process of controlling the viscosity of aqueous mud-laden drilling fluids by adding thereto a small percentage of a viscosity-reducing compound having a substantial portion of a polyphosphoric acid residue, which compound is an amino-phosphate body and characterized by the fact that it is capable of reducing viscosity resulting from the state of gelation of said fluid during the drilling operation.

9. An aqueous mud-laden well drilling-fluid, the viscosity of which is subject to augmentation by the acquisition therein of gel-forming substances during the drilling operation, containing a small percentage of a viscosity-reducing compound having a substantial portion of a phosphorus acid residue, which compound is an amino-phosphate body characterized by the fact that it is capable of reducing viscosity resulting from the state of gelation of said fluid during the drilling operation.

10. An aqueous mud-laden drilling-fluid for wells containing a small percentage of a viscosity-reducing agent comprising an amino-phosphate body, viz.,

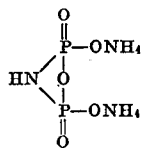

and characterized by the fact that it is dispersible in a mud-laden fluid, and further characterized by the fact that it is capable of reducing viscosity resulting from the state of gelation of said fluid during the drilling operation.

11. An aqueous mud-laden drilling-fluid for wells containing a small percentage of a viscosity-reducing agent comprising an amino-phosphate body, viz.,

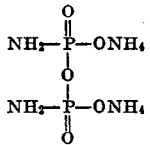

and characterized by the fact that it is dispersible in a mud-laden fluid, and further characterized by the fact that it is capable of reducing viscosity resulting from the state of gelation of said fluid during the drilling operation.

12. An aqueous mud-laden drilling-fluid for wells containing a small percentage of a viscosity-reducing agent comprising an amino-phosphate body, viz.,

wherein $NX_2$ is a residue selected from the group consisting of substituted and unsubstituted amino residues, and R and R' is a radical selected from the group consisting of alkyl, aryl, aralkyl, and alicyclic radicals, and characterized by the fact that it is capable of reducing viscosity resulting from the state of gelation of said fluid during the drilling operation.

13. The process of controlling the viscosity of aqueous mud-laden drilling-fluids by adding thereto a small percentage of a viscosity-reducing agent comprising an amino-phosphate body, viz.,

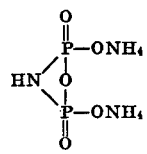

and characterized by the fact that it is dispersible in a mud-laden fluid, and further characterized by the fact that it is capable of reducing viscosity resulting from the state of gelation of said fluid during the drilling operation.

14. The process of controlling the viscosity of aqueous mud-laden drilling-fluids by adding thereto a small percentage of a viscosity-reducing agent comprising an amino-phosphate body, viz.,

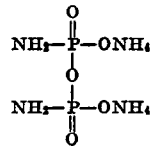

and characterized by the fact that it is dispersible in a mud-laden fluid, and further characterized by the fact that it is capable of reducing viscosity resulting from the state of gelation of said fluid during the drilling operation.

15. The process of controlling the viscosity of aqueous mud-laden drilling-fluids by adding thereto a small percentage of a viscosity-reducing agent comprising an amino-phosphate body, viz.,

wherein $NX_2$ is a residue selected from the group consisting of substituted and unsubstituted amino residues, and R and R' is a radical selected from the group consisting of alkyl, aryl, aralkyl, and alicyclic radicals, and characterized by the fact that it is capable of reducing viscosity resulting from the state of gelation of said fluid during the drilling operation.

TRUMAN B. WAYNE.